(12) United States Patent
Nerone et al.

(10) Patent No.: US 6,525,488 B2
(45) Date of Patent: Feb. 25, 2003

(54) SELF-OSCILLATING SYNCHRONOUS BOOST CONVERTER

(75) Inventors: Louis R. Nerone, Brecksville, OH (US); David J. Kachmarik, Strongsville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/861,208

(22) Filed: May 18, 2001

(65) Prior Publication Data

US 2002/0175638 A1 Nov. 28, 2002

(51) Int. Cl.[7] .............................................. H05B 37/02
(52) U.S. Cl. ........................ 315/209 R; 315/209 R; 315/224; 315/225; 315/226; 315/289; 315/360
(58) Field of Search .......................... 315/291, 209 R, 315/224, 225, 226, 289, 307, DIG. 5, DIG. 7, 360, 362

(56) References Cited

U.S. PATENT DOCUMENTS

| | | | |
|---|---|---|---|
| 5,796,214 A | 8/1998 | Nerone | 315/209 R |
| 5,917,289 A | 6/1999 | Nerone et al. | 315/209 R |
| 6,057,648 A | 5/2000 | Nerone et al. | 315/209 R |
| 6,078,143 A | 6/2000 | Nerone | 315/209 R |
| 6,150,769 A * | 11/2000 | Nerone et al. | 315/209 R |

* cited by examiner

*Primary Examiner*—Don Wong
*Assistant Examiner*—Thuy Vinh Tran
(74) *Attorney, Agent, or Firm*—Fay, Sharpe, Fagan, Minnich & McKee, LLP

(57) ABSTRACT

A self-oscillating boost converter includes a resistor-starting network configured to start a charging of the boost converter. A resonant feedback circuit is designed to generate an oscillating signal following the starting of the circuit by the resistor-starting network. A complementary switching network has a pair of complementary common-source connected switches configured to receive the oscillation signal generated by the resonant feedback circuit. The oscillation signal determines a switching rate, or duty cycle, of the complementary pair of switches. A boost inductor is in operational connection with the complementary pair of switches. The switching rate of the complementary switching network acts to determine the boost voltage supplied to a load.

17 Claims, 4 Drawing Sheets

SELF-OSCILLATING SYNCHRONOUS BOOST CONVERTER

BACKGROUND OF THE INVENTION

The present invention relates to a boost converter, and more particularly to a circuit to efficiently convert low voltages to a current for powering a light-emitting diode (LED).

LEDs are beginning to be implemented in environments previously reserved for that of incandescent lamps. One type of LED being used as such a replacement is a white LED, which is a blue LED having a phosphor that converts the ultra-violet or blue color to white. These white LEDs PROVIDE certain advantages over incandescent lamps, including having a lumens per watt rating of approximately 20, whereas an incandescent lamp of the same size will have a lumens per watt rating of 7–10. Further, similarly sized batteries will last for approximately twice as long when used with a white LED as opposed to an incandescent lamp. It is also known the white LEDs themselves will last longer at higher voltages than an incandescent lamp. For example, a incandescent lamp may last 50–100 hours, where a white LED may last as long as 10,000 hours or more at the same high voltage. White LEDs are also known to exhibit a brighter light output than other LEDs.

A drawback of white LEDs is that they have a larger band gap than other LED types. This larger band gap requires an operational voltage which is significantly higher than other LEDs, approximately 4 volts.

Approaches which have been used to supply the necessary voltage levels to a white LED include a d.c.-d.c. converter to regulate the output voltage. However, this approach is costly and is inefficient at low input voltages. Another approach has been to use a lithium cell to match the LED voltage directly. Again this is a costly and inefficient approach. Further, the settings in which the white LED light source of this application is intended to be used are low-cost implementations. For example, it is desired that the lighting system be able to be used with low power input such as two AA-size batteries. However, this battery combination is known to generate only approximately 1.5–3.1 volts. This voltage is of course not sufficient to operate the white LED.

Therefore, it has been determined that a need exists for an efficient circuit capable of transforming low battery voltages to an LED current sufficient to operate the white LED. Such a circuit must also be provided at a low component count and for small economic cost.

BRIEF SUMMARY OF THE INVENTION

A self-oscillating boost converter includes a resistor-starting network configured to start a charging of the boost converter. A resonant feedback circuit is designed to generate an oscillating signal, following the starting of the circuit by the resistor-starting network. A complementary switching network has a pair of complementary common-source connected switches configured to receive the oscillation signal generated by the resonant feedback circuit. The oscillation signal determines a switching rate, or duty cycle, of the complementary pair of switches. A boost inductor is in operational connection with the complementary pair of switches. The switching rate of the complementary switching network acts to determine the boost voltage supplied to a load.

DETAILED DESCRIPTION OF THE PREFERRED EMBODIMENT

Figure 1:
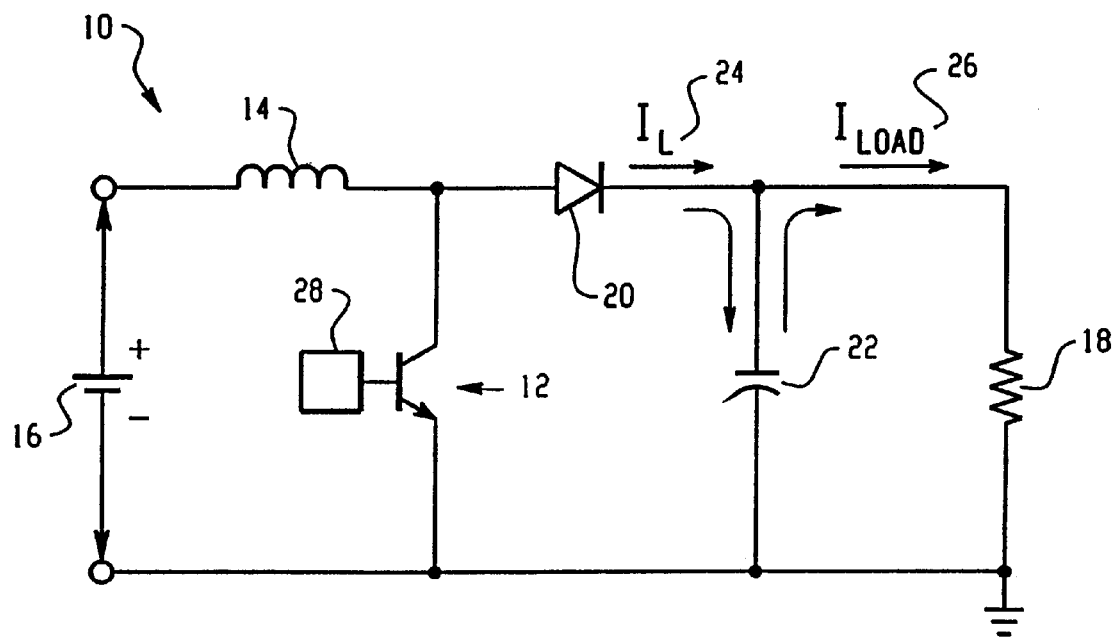
FIG. 1 depicts a commonly used boost converter.

FIG. 1 illustrates a known boost or step-up switching regulator 10. Such a regulator is implemented when a required operational voltage is higher than a supplied input voltage. A control switching element 12 is connected to a boost inductor 14, which in turn is connected to a voltage source 16. When control switching element 12 turns on, input voltage ($V_{in}$) from voltage source 16 is impressed across inductor 14 as inductor voltage ($V_1$). During steady state conditions, the current in inductor 14 increases linearly in a forward direction. Load 18 is isolated by isolation diode 20, and during this time is supplied by a charge stored on circuit capacitor 22.

When control element 12 is turned off, energy stored in inductor 14 is added to the input voltage, and the inductor current 24 assists in supplying the load current 26 and also acts to restore the energy discharged from the circuit capacitor 22. When the control element 12 turns off, the voltage in the inductor ($V_1$) is equal to the output voltage ($V_O$) minus the input voltage ($V_{in}$)(i.e. $V_1 = V_O - V_{in}$). Operation of control element 12 is achieved by use of controller 28. In this conventional boost circuit 10, diode 20 is considered a passive switch, and control element 12 an active switch.

Figure 2:
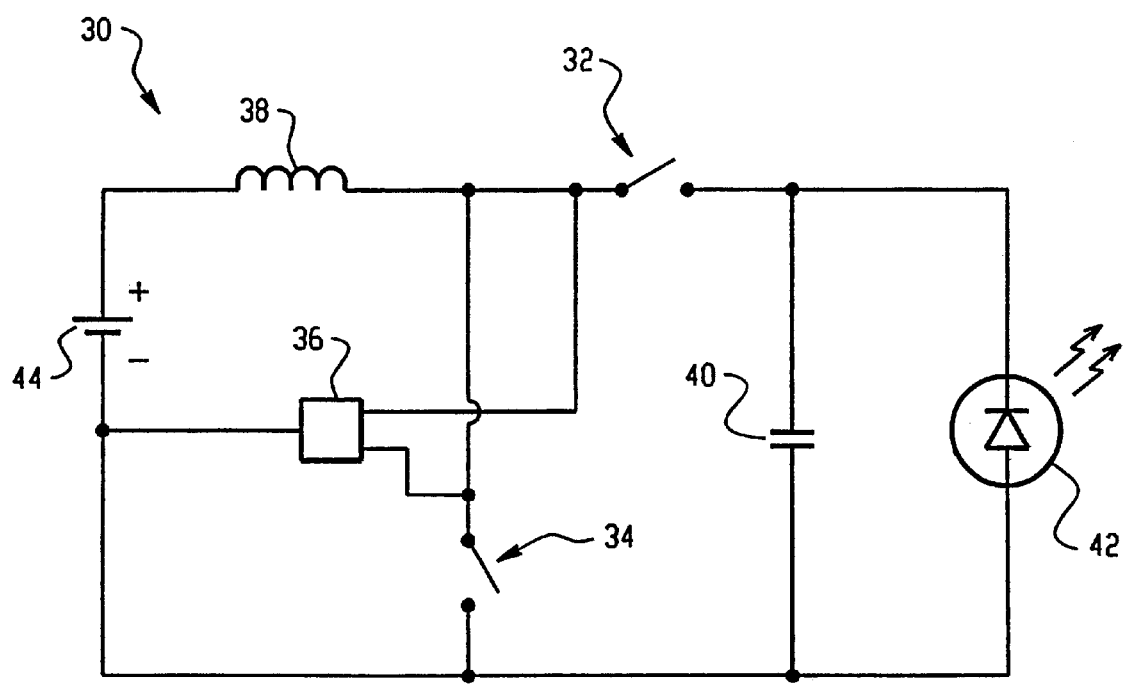
FIG. 2 sets forth a self-oscillating synchronous boost converter according to the concepts of the present invention.

To improve efficiency of a circuit powering a white LED, the present invention replaces passive switch 20 of FIG. 1 with an active switch to provide a self-oscillating synchronous boost converter using a complementary pair of switches. FIG. 2 illustrates such a self-oscillating synchronous boost converter 30. In this embodiment, passive switch 20 of FIG. 1 is replaced with active switch 32. Operation of switches 32 and 34 is controlled by synchronous switch controller 36 which permits energy from inductor 38 to be supplied to load 42 along with energy from input source 44. This energy allows for a higher voltage or boosted voltage to be supplied to load 42, than that delivered by input voltage source 44 alone.

In a preferred embodiment, converter 30 supplies a voltage sufficient for the load 42, which may be the white LED, to have at least 80 milli-amps generated. It is to be understood that by adjusting the operation of switches 32 and 34, by controller 36 and selecting appropriate sizes of the components, including capacitor 40 and inductor 38, a variety of voltage values and currents may be obtained dependent upon the requirements of load 42.

With continuing attention to FIGS. 1 and 2, it is noted that a drawback of a conventional converter 10 is that at very low voltage applications, the diode drop, which is anywhere from 0.7 to 1 volt, introduces undesirable inefficiencies into the system. Such losses are a significant amount of the total at low voltages. Therefore, to improve efficiency, diode 20 of FIG. 1, is replaced with active switch 32 of FIG. 2. Switch 32 has a lower on-resistance value as compared to diode 20, even if a low breakdown diode is used as passive switch 20. Thus the circuit in FIG. 2 is beneficial for improving operational efficiencies, especially at low-voltages.

Controlling the on-times of active switches 32 and 34, determines the voltage delivered to the load, such as a white LED 42. Particularly, the output voltage ($V_{out}$) is controlled by the duty ratio of the switching frequency, wherein the duty cycle is defined as:

$$D = \frac{V_{out} - V_{in}}{V_{out}},$$

therefore in an implementation where the desired output voltage is 4 volts, and the input voltage is 2.42 volts (this is a nominal value of 2 AA cell batteries) the on-time switching ratio of switch 34 is to be:

$$D = \frac{4v - 2.42v}{4v} = .395$$

It is noted that in FIG. 2, the arrangement of the input source is connected in a positive configuration. In some situations, which will be discussed in greater detail below, the circuit may work more efficiently being arranged in a negative input configuration.

Figure 3:
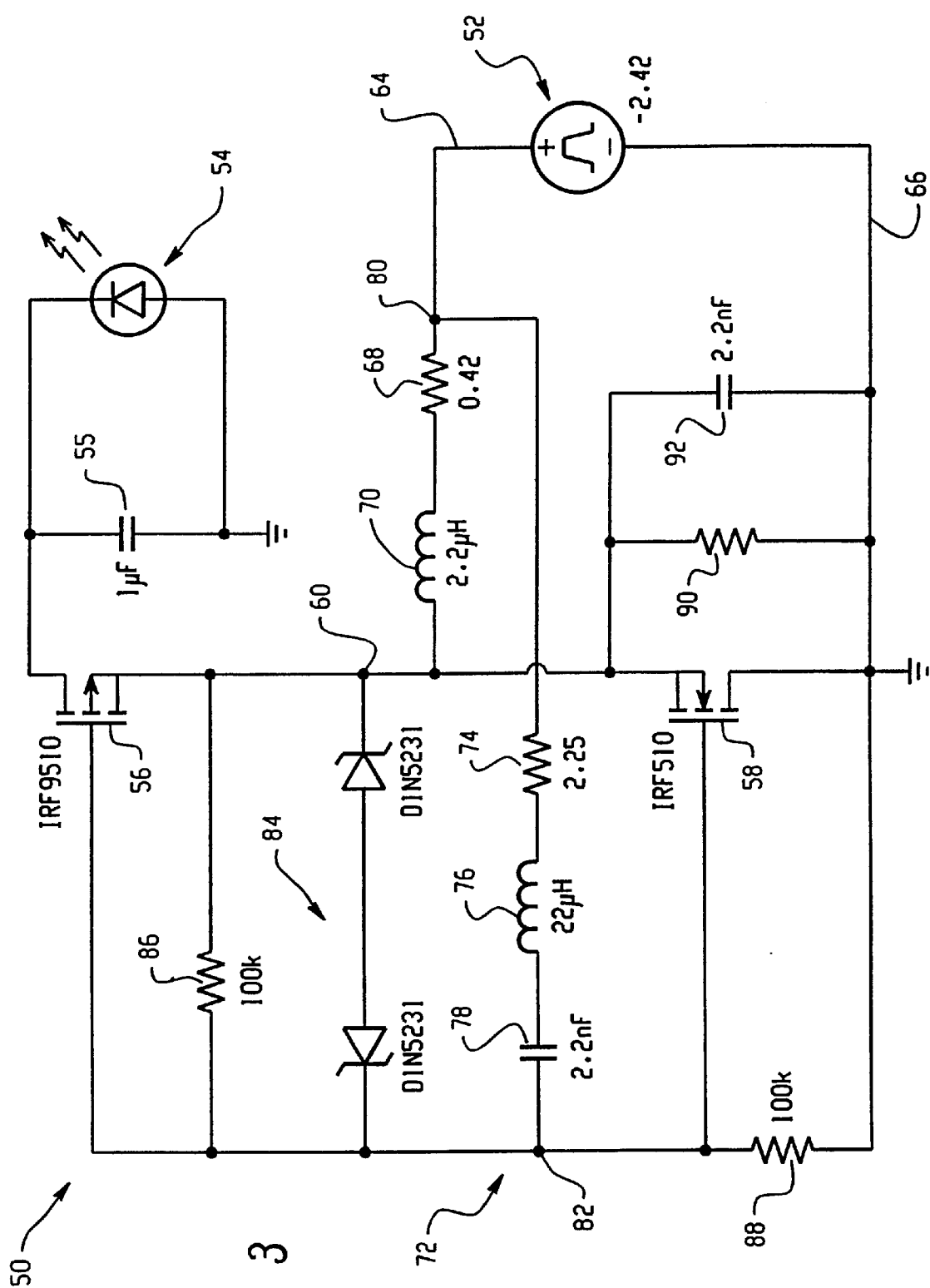
FIG. 3 illustrates a more detailed circuit providing self-oscillating boost conversion according to an embodiment of the present invention.

Turning to FIG. 3, shown is a second embodiment of the present invention which sets forth more detailed descriptions of the components of synchronous boost converter 50. In this circuit, a negatively biased d.c. source 52 is used to supply a load 54, such as a white LED, connected across a filter capacitor 55. Two complementary switches 56 and 58 are arranged in a common source configuration wherein the sources of switches 56 and 58 are tied together at node 60. One end of voltage source 52 is connected to bus conductor 64 and a second end of source 52 is connected to reference conductor 66. Resistor 68 and storage or boost inductor 70 are serially connected between d.c. source 52 and node 60. Feedback circuit 72 includes serially connected resistor 74, inductor 76, and capacitor 78, connected to bus conductor 64 at node 80 and to control node 82. The gate or control electrodes of switches 56 and 58 are preferably directly connected together at control node 82. It is noted that resistors 68 and 74 may be the inherent resistance of the components, rather than separate resistors. Also, switches 56 and 58 will have intrinsic diodes.

Switches 56 and 58, are used to convert the supplied input voltage to a boosted signal for supplying LED 54. When the switches comprise n-channel and p-channel enhancement mode MOSFETs, respectively, the source electrodes of the switches are preferably connected directly together at common node 60. It is to be noted, however, that the switches may comprise other devices having complementary conduction modes, such as PNP and NPN bi-polar junction transistors.

Optionally provided is a bi-directional voltage clamp 84 connected between common node 60 and control node 82. This bi-directional voltage clamp may be configured as the back-to-back zener diode shown, and is used to ensure control of voltage supplied to LED 54. Clamp 84 is an optional component and may not be as useful in low-voltage environments. Starting resistors 86, 88 and 90 cooperate in charging circuit 50 for starting regenerative operation of feedback circuit 72. A conventional snubber capacitor 92 is provided to assist in switching of switches 56 and 58.

Upon energization, feedback circuit 72 supplies sufficient gain to circuit 50 to cause self-oscillation. Particularly, as input voltage source 52 is a fixed point, the signal at node 82 begins to swing up and down, providing sufficient delay to drive switches 56, 58 at a desired phase angle. The oscillations generated by feedback circuit 72, therefore, determine the operating frequency of the switches 56 and 58, i.e. feedback circuit 72 determines the duty cycle of switches 56 and 58. Selection of the components of feedback circuit 72 determines the amount of time each switch is on, and therefore how much of a boost in voltage is provided by boost converter circuit 50. Specifically, as the current builds up in inductor 70, a larger voltage will be generated across inductor 70 to be delivered to LED 54. Feedback circuit 72 is a resonant network, supplying its signal back to source 52.

Figure 4:
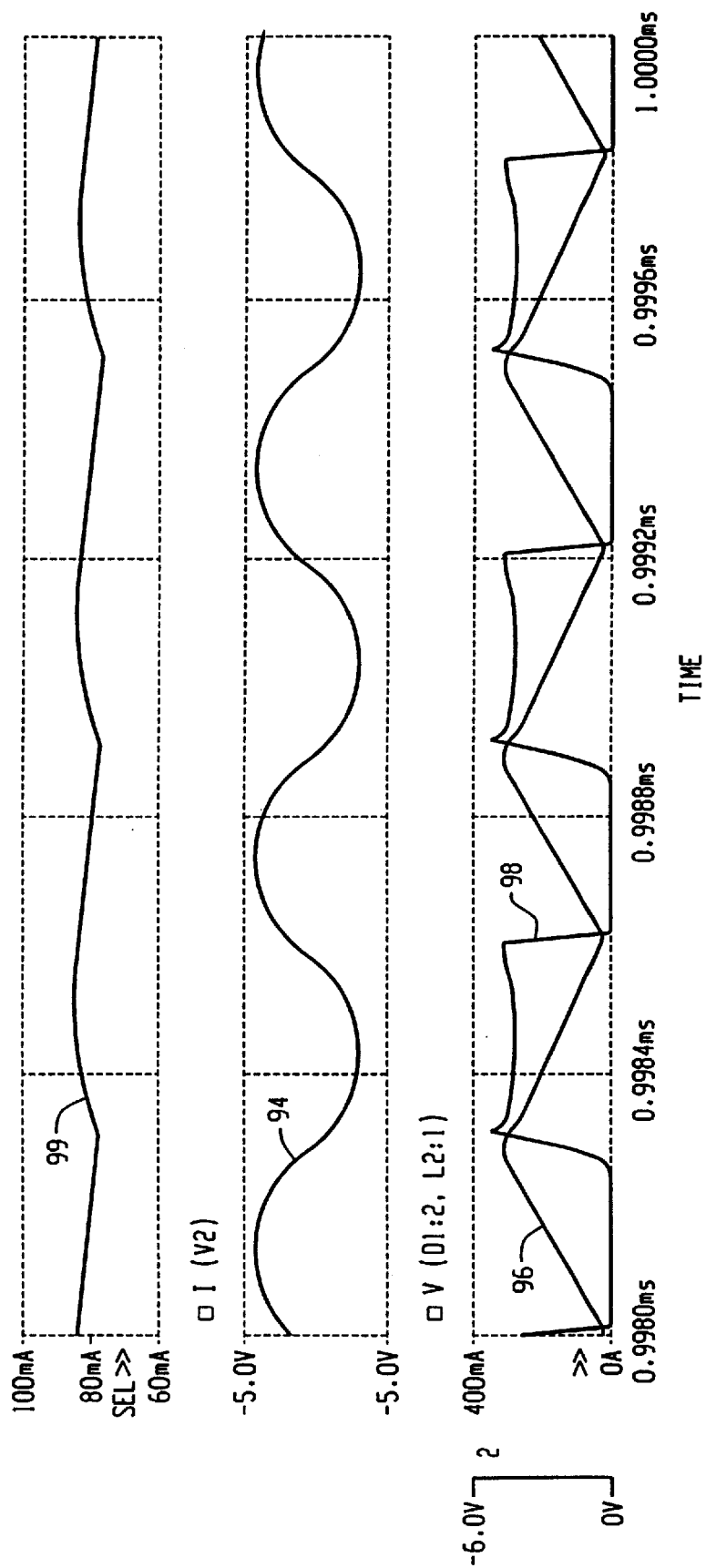
FIG. 4 are various waveforms of a converter such as that of FIG. 3.

FIG. 4 illustrates the oscillating or sinusoidal signal waveform 94 supplied to the gates of switches 56,58. It is noted that the gate voltage of FIG. 4 has a d.c. bias applied to it, i.e. the transition is not at zero volts. This d.c. bias an offset allows the switches to run at an appropriate duty cycle. Circuit 50 is designed such that when the source 52 is at its nominal voltage, the duty cycles are substantially operating at the desired ratios. For example, in this embodiment when the nominal input voltage is approximately 2.42 volts, an approximate 0.4 duty cycle for switch 58, will result in an output voltage of approximately 4 volts.

Also, illustrated in FIG. 4 is the inductor current 96 across inductor 70 and voltage signal 98 across inductor 70 to ground. The increase in current 96 occurs during a time period in which the bottom n-channel switch 58 is active. When switch 58 is turned off and switch 56 is activated, the inductor current 96 decreases and the voltage 98 is provided to LED 54. This results in a somewhat steady state current 99 of 80 milli-amps to LED 54 at nominal voltage of source 52.

The components of feedback circuit 72 (i.e. resistor 74, inductor 74 and capacitor 78) is used to alter the duty cycle to be other than a 50/50 duty cycle between switches 56 and 58. Feedback circuit 72 accomplishes this by generating the offset of the gate to source signal 94.

In this embodiment, the desired output is for the generation of 80 milli-amps to LED 54 at a nominal input of 2.42 volts. While the present circuit is not a regulator, however by proper selection of components, a useful light output over the life of the LED and battery is obtainable. It is noted that the 80 milli-amps is specified for a white LED for proper brightness. However, it is to be understood that this is the ideal nominal value. The LEDs however, will function properly not being specifically at this value.

It is to be appreciated, that in other implementations, different current values may be necessary. The present circuit can accommodate these situations by selection of different component values. Particularly, by adjusting the offset created by the feedback circuit, adjustment of the switching ratio may be achieved to obtain varying outputs.

Figure 5:
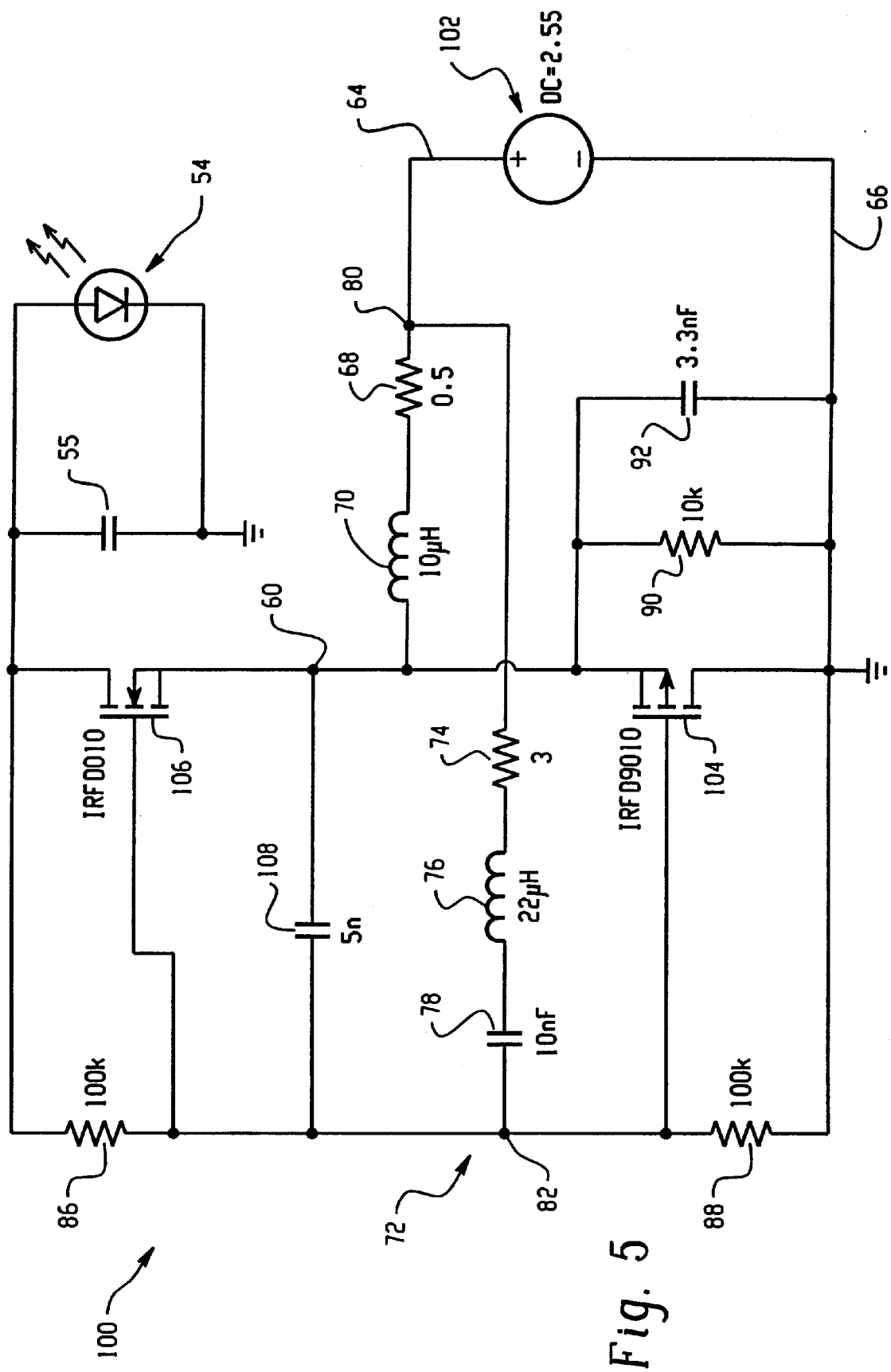
FIG. 5 sets forth a second embodiment of a self-oscillating synchronous boost converter of the present invention.

Turning to FIG. 5, illustrated is a further embodiment of a synchronous boost converter circuit 100 according to the concepts of the present invention. The major distinction between this embodiment and the embodiment of FIG. 3, is that the d.c. voltage source 102 is provided in a positive output configuration. A positive voltage source is used in this embodiment since a p-channel switch 104 is placed at the bottom portion of circuit 100 and an n-channel switch 106 of the complementary pair is the upper switch.

Also, a limiting capacitor 108 is optionally provided to predictably limit the rate of change of control voltage between nodes 60 and 80. Further like components are numbered in the same manner as FIG. 3.

Other minor component changes such as the placement of resistor 86 are made. However, this simply emphasizes that the exact configuration of the components may change and the converter will still be maintained within the spirit and scope of the present invention. Particularly, the present invention uses complementary switching concepts to configure a synchronous boost converter capable of working with low voltages.

The reason an n-channel switch is used in the bottom switching position of FIG. 3, is that an n-channel device has a lower on-resistance (lower rds) for the same size and type of p-channel device. In this embodiment, for the intended switching ratio, it is considered that the n-channel will be on longer than the upper p-channel. Therefore, placing the n-channel in the bottom portion under FIG. 3 provides for a more efficient circuit. Similarly, in FIG. 5, this configuration is chanced when it is believed that the ratios will have the upper switch on for a longer period of time. Therefore, as a general statement, when a smaller input voltage is being used, and the bottom switch will be on longer than the upper switch, the n-channel is to be positioned at the bottom switching position.

While the invention has been described with reference to a preferred embodiment, it will be understood by those skilled in the art that various changes may be made and equivalents may be substituted for elements thereof, without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the invention, but that the invention will include all embodiments falling within the scope of the appended claims.

What is claimed is:

1. A self-oscillating boost converter comprising:
    a resistor starting network configured to start a charging of the boost converter;
    a resonant feedback circuit configured to generate an oscillating signal following the starting of operation of the circuit by the resistor starting network;
    a complementary switching network having a pair of complementary common source connected switches configured to receive the oscillation signal generated by the resonant feedback circuit, wherein the oscillation signal determines a switching rate of the complementary pair of switches; and
    a boost inductor in operational connection with the complementary pair of switches, wherein the switching rate of the complementary switching network determines a boost voltage.

2. The invention according to claim 1 further including:
    a load in operational connection with at least one of the complementary pair of switches, to receive the boost voltage.

3. The invention according to claim 2 wherein the load is a white LED.

4. The invention according to claim 3 wherein an input voltage supplied to the boost converter is between approximately 1.5 volts and 3.1 volts.

5. The invention according to claim 4 wherein the boost voltage supplied to the load is approximately 4 volts.

6. The invention according to claim 1 wherein the boost converter is configured to operate with a negative voltage supply.

7. The invention according to claim 1 wherein the boost converter is configured to operate with a positive voltage supply.

8. The self-oscillating boost converter of claim 1, wherein the complementary pair of switches include,
    a first switch having an on-resistance value; and
    a second switch having an on-resistance value less than the on-resistance value of the first switch, wherein the switching rate of the generated oscillation signal is selected to have the second switch in an on state for a time period longer than the first switch.

9. The self-oscillating boost converter of claim 1, wherein the oscillation signal includes a d.c. bias offset from zero volts.

10. The self-oscillating boost converter of claim 1, wherein the boost inductor is arranged within the converter such that a current across the boost inductor increases during a first time period, and the inductor current drops during a second time period, resulting in a substantially steady state current to a white LED.

11. A self-oscillating boost converter for converting an input voltage supplied by an input source to a level sufficient to operate a white LED, the boost converter comprising:
    a resistor starting network configured to start a charging of the boost converter;
    a resonant feedback circuit including a resonant capacitance, inductance and resistance configured to generate an oscillating signal following the starting of operation of the circuit by the resistor starting network;
    a complementary switching network having a first switch with an on-resistance value and a second switch with an on-resistance value less than the on-resistance value of the first switch, the first switch and the second switch being a pair of complementary common source connected switches configured to receive the oscillation signal generated by the resonant feedback circuit, wherein the oscillation signal determines a switching rate of the complementary pair of switches, and the switching rate of the generated oscillation signal is selected to have the second switch be on for a time period longer than the first switch; and
    a boost inductor in operational connection with the complementary pair of switches, wherein the switching rate of the complementary switching network determines a boost voltage, and
    wherein the voltage supplied by the boost voltage and the input source is sufficient to power the white LED.

12. The invention according to claim 11 wherein an input voltage supplied to the boost converter is between approximately 1.5 volts and 3.1 volts.

13. The invention according to claim 11 wherein the boost voltage supplied to the white LED is approximately 4 volts.

14. The invention according to claim 11 wherein the boost converter is configured to operate with a negative voltage supply.

15. The invention according to claim 11 wherein the boost converter is configured to operate with a positive voltage supply.

16. A method of converting, by a self-oscillating boost converter, an input voltage supplied by an input source to a level sufficient to operate a white LED, the method comprising:
    charging the boost converter to start operation;
    generating an oscillating signal, following the start of operation, by a resonant feedback circuit including a resonant capacitance, inductance and resistance;
    receiving the oscillation signal, generated by the resonant feedback circuit, by a complementary switching network having a first switch with an on-resistance value and a second switch with an on-resistance value less than the on-resistance value of the first switch, the first switch and the second switch being a pair of complementary common source connected switches configured, wherein the oscillation signal determines a switching rate of the complementary pair of switches, and the switching rate of the generated oscillation signal is selected to have the second switch be in an on state for a time period longer than the first switch;

generating a boost voltage of a boost inductor in operational connection with the complementary pair of switches, the boost voltage being dependent on the switching rate of the complementary switching network; and supplying the boost voltage to the white LED.

17. The method according to claim 16, wherein the step of supplying further includes supplying at least a portion of the input voltage from the input source to the white LED, along with the boost voltage.

* * * * *